US012798937B2

(12) United States Patent
Herzog

(10) Patent No.: US 12,798,937 B2
(45) Date of Patent: Nov. 17, 2026

(54) VEHICLE UNDECKING SYSTEM

(71) Applicant: Gray Manufacturing Company, Inc., St. Joseph, MO (US)

(72) Inventor: Ryan Herzog, Darlington, MO (US)

(73) Assignee: Gray Manufacturing Company, Inc., St. Joseph, MO (US)

( * ) Notice: Subject to any disclaimer, the term of this patent is extended or adjusted under 35 U.S.C. 154(b) by 388 days.

(21) Appl. No.: 18/401,830

(22) Filed: Jan. 2, 2024

(65) Prior Publication Data

US 2024/0239636 A1 Jul. 18, 2024

Related U.S. Application Data

(60) Provisional application No. 63/479,942, filed on Jan. 13, 2023.

(51) Int. Cl.
*B66F 7/28* (2006.01)

(52) U.S. Cl.
CPC .................................... *B66F 7/28* (2013.01)

(58) Field of Classification Search
CPC ........................................................ B66F 7/20
See application file for complete search history.

(56) References Cited

U.S. PATENT DOCUMENTS 3,018,848 A * 1/1962 Ross ......................... B66F 7/20 187/219
3,458,013 A * 7/1969 Haynes ..................... B66F 7/20 187/217
3,985,207 A * 10/1976 Petit .......................... B66F 7/04 187/216
4,724,875 A * 2/1988 Baldwin ............... B66F 7/0641 254/89 R
4,828,222 A * 5/1989 Rossato ................ B66F 7/0691 254/90
4,867,468 A * 9/1989 Paul ....................... B62D 53/00 280/901
4,949,540 A * 8/1990 Wich ...................... F15B 11/22 137/99
5,001,798 A * 3/1991 Hamilton ............ E04B 1/34347 254/88
5,873,593 A * 2/1999 Gesuale .................... B60P 3/07 280/411.1
6,173,941 B1 * 1/2001 Johnston ................. B66F 7/243 254/90

(Continued)

*Primary Examiner* — Jonathan Snelting
(74) *Attorney, Agent, or Firm* — Hovey Williams LLP; Kameron D. Kelly

(57) ABSTRACT

A vehicle undecking system for undecking a towed vehicle from a towing vehicle. The system comprises at least one portable vehicle lift. Each lift includes a base, a carriage configured to receive a portion of the towed vehicle, and an actuator configured to vertically raise and lower the carriage relative to the base. The system further comprises a support assembly including at least one ramp and at least one main platform. The at least one ramp is configured to be coupled with the at least one main platform. The at least one ramp includes an angled top driving surface, and the at least one main platform includes a generally horizontal top driving surface. The at least one main platform includes a receiving space located below the top driving surface. The receiving space is configured to receive at least a portion of the base of the lift.

22 Claims, 11 Drawing Sheets

(56) References Cited

U.S. PATENT DOCUMENTS

| | | | | |
|---|---|---|---|---|
| 6,186,280 | B1 * | 2/2001 | Healy | B66F 7/20 187/390 |
| 6,817,449 | B2 * | 11/2004 | Berends | B66F 7/20 91/171 |
| 9,636,957 | B2 * | 5/2017 | Duvall | B60D 1/01 |
| 10,773,936 | B2 * | 9/2020 | Hudson | B66F 13/00 |
| 11,332,352 | B2 * | 5/2022 | Bowers | B66F 7/28 |
| 2010/0038181 | A1 * | 2/2010 | Jones | B66F 7/28 187/244 |
| 2021/0122619 | A1 * | 4/2021 | De Jong | B66F 7/20 |
| 2022/0356053 | A1 * | 11/2022 | Perlstein | G08B 7/06 |

* cited by examiner

VEHICLE UNDECKING SYSTEM

CROSS-REFERENCE TO RELATED APPLICATION

The present non-provisional patent application claims priority benefit to U.S. Provisional Patent Application Ser. No. 63/479,942, filed Jan. 13, 2023, and entitled "TRUCK UNDECKING SYSTEM." The entirety of the above-identified provisional patent application is hereby incorporated by reference into the present non-provisional patent application.

FIELD OF THE INVENTION

Embodiments of the present invention are generally directed to systems for decking and undecking vehicles. More particularly, embodiments of the present invention are directed to systems for decking and undecking large vehicles, such as semi-trailer trucks.

BACKGROUND OF THE INVENTION

Truck driveaway companies have been decking and undecking vehicles, such as semi-trailer trucks (referred to herein as "trucks"), for decades. The term "decking" refers to mounting one or more towed trucks to a towing truck, while the term "undecking" refers to unmounting one or more towed trucks from a towing truck. The truck decking process includes attaching multiple trucks to each other to allow for a single truck (with a single driver) to transport multiple trucks (e.g., one, two, three, four, or more) at one time, e.g., between a commercial vehicle original equipment manufacturer and a customer. FIG. 1 illustrates a single truck (i.e., a towing truck 10) having three additional trucks (i.e., towed trucks 12) decked onto the towing truck 10 (and/or on to each other), such that the single towing truck 10 can transport three additional, towed trucks 12. Having the ability to transport multiple vehicles at once better utilizes driver resources, which saves time and money. Once the decked trucks have arrived at their intended destination, the trucks can be undecked for individual use, sale, or the like.

Prior processes for decking and undecking trucks required use of an overhead crane, gantry crane, or a heavy-duty wrecker. A heavy-duty strap would be rigged from the overhead lifting crane or wrecker to two front tow hooks on the towed truck that is to be decked/undecked. It is noted, however, that such tow hooks of a truck are not designed to be used as a lift point, only as a tow point. To undeck a towed truck from a towing truck, the towed truck is hoisted in the air while an operator crawls under the suspended towed truck to adjust retaining nuts and bolts from a decking frame saddle that is used to connect the towed truck to the towing truck. It is noted that a decking frame saddle is used between each pair of trucks that are decked to each other. For example, when four trucks are decked together, three decking frame saddles are used to deck each truck to the truck in front of it. As such, with the towed truck disconnected from the decking frame saddle, the towed truck can be undecked from the towing truck. Performing such steps in an opposite order would allow for trucks to be decked together. However, having an operator crawl under a truck suspended by straps via the truck's tow hooks can be dangerous.

SUMMARY OF THE INVENTION

One aspect of the present invention concerns a vehicle undecking system for undecking a towed vehicle from a towing vehicle. The system comprises at least one portable vehicle lift. Each lift includes a base, a carriage configured to receive a portion of the towed vehicle, and an actuator configured to vertically raise and lower the carriage relative to the base. The system further comprises a support assembly including at least one ramp and at least one main platform. The at least one ramp is configured to be coupled with the at least one main platform. The at least one ramp includes an angled top driving surface, and the at least one main platform includes a generally horizontal top driving surface. The at least one main platform includes a receiving space located below the top driving surface. The receiving space is configured to receive at least a portion of the base of the lift.

Another aspect of the present invention concerns a vehicle undecking system configured to undeck a towed vehicle from a towing vehicle. The system comprises a support assembly including at least one ramp and at least one main platform. The at least one ramp is configured to be coupled with the at least one main platform. The at least one ramp includes an angled top driving surface, and the at least one main platform includes a generally horizontal top driving surface. The at least one main platform includes a receiving space located below the top driving surface. The receiving area presents an opening that extends through an entire width of the at least one main platform.

Still another aspect of the present invention concerns a process for undecking a towed vehicle that is supported on a towing vehicle. The process comprises a number of steps. One step includes providing a support assembly including a first section and a second section. Each section includes at least one ramp and at least one main platform. The at least one ramp includes an angled top driving surface. The at least one main platform includes a generally horizontal top driving surface. An additional step includes driving rear wheels of the towing vehicle onto the support assembly. An additional step includes positioning a lift on each side of the towed vehicle, adjacent to front wheels of the towed vehicle. Each lift includes a base, a carriage configured to receive one of the front wheels of the towed vehicle, and an actuator configured to vertically raise and lower the carriage relative to the base. A further step includes shifting the lifts into engagement with the front wheels of the towed vehicle. During such shifting step, at least a portion of the bases of the lifts are inserted within receiving spaces presented below the top driving surfaces of the main platforms of the support assembly.

Yet another aspect of the present invention concerns a process for decking a towed vehicle to a towing vehicle. The process comprises a number of steps. One step includes positioning a lift on each side of the towed vehicle, adjacent to front wheels of the towed vehicle. Each lift includes a base, a carriage configured to receive a front wheel of the towed vehicle, and an actuator configured to vertically raise and lower the carriage relative to the base. An additional step includes raising, via the lifts, the front wheels of the towed vehicle. An additional step includes providing a support assembly including a first section and a second section. Each section includes at least one ramp and at least one main platform. The at least one ramp includes an angled top driving surface, and the at least one main platform includes a generally horizontal top driving surface. Upon the providing step, at least a portion of the bases of the lifts are received within receiving spaces presented below the top driving surfaces of the main platforms of the support assembly. A further step includes driving the rear wheels of the towing vehicle onto the support assembly.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE FIGURES

Embodiments of the present invention are described herein with reference to the following drawing figures, wherein.

Figure 1:
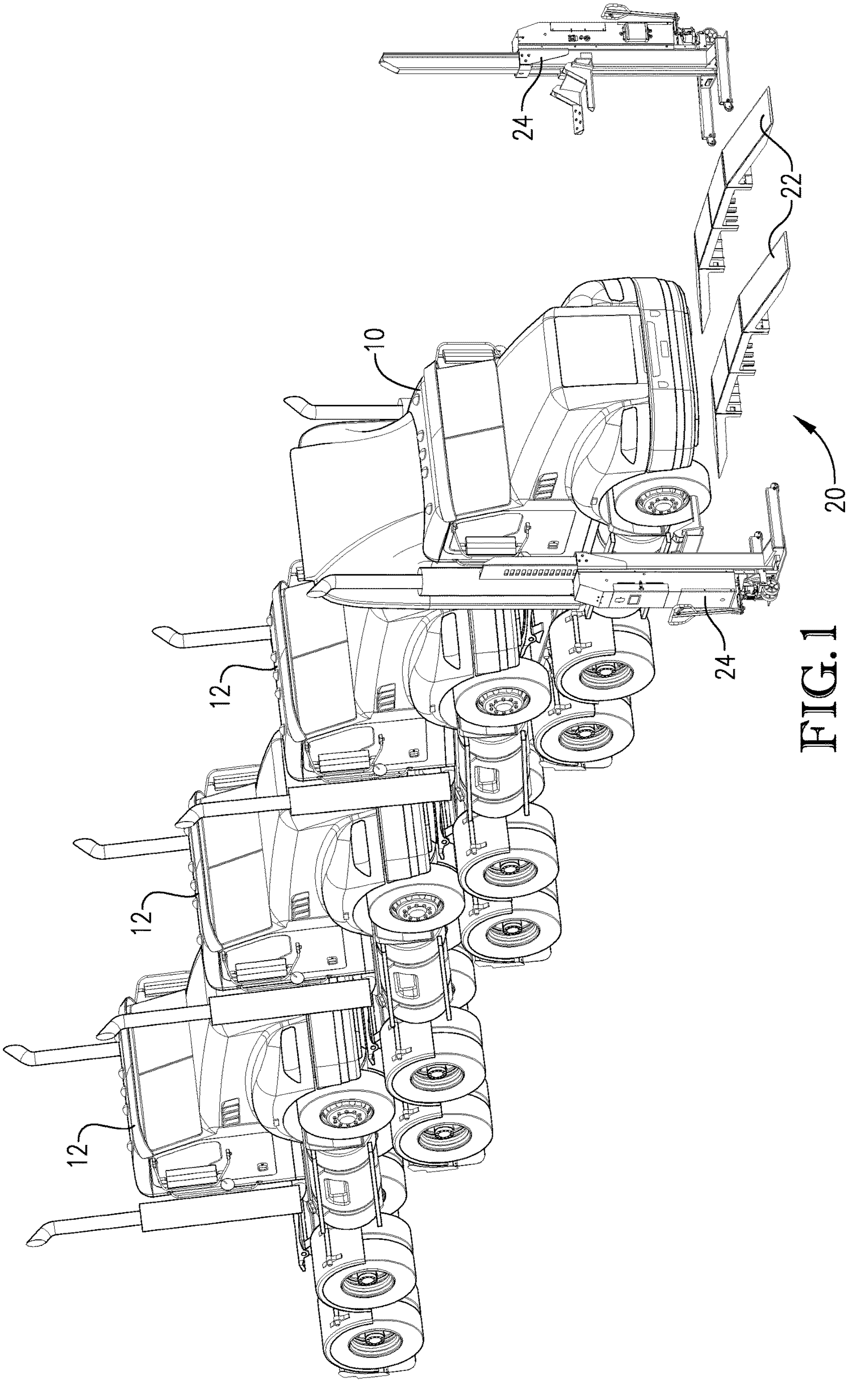
FIG. 1 is a perspective view of a truck undecking system according to embodiments of the present invention, which can be used to undeck a group of decked trucks that include a towing truck and plurality of towed trucks.

The figures are not intended to limit the present invention to the specific embodiments they depict. While the drawings do not necessarily provide exact dimensions or tolerances for the illustrated structures or components, the drawings are to scale with respect to the relationships between the components of the structures illustrated in the drawings.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Relational and/or directional terms, such as “above”, “below”, “up”, “upper”, “upward”, “down”, “downward”, “lower”, “top”, “bottom”, “outer”, “inner”, etc., along with orientation terms, such as “horizontal” and “vertical”, may be used throughout this description. These terms retain their commonly accepted definitions and are used with reference to embodiments of the technology and the positions, directions, and orientations thereof shown in the accompanying figures. Embodiments of the technology may be positioned and oriented in other ways or move in other directions. Therefore, the terms do not limit the scope of the current technology.

Figure 2:
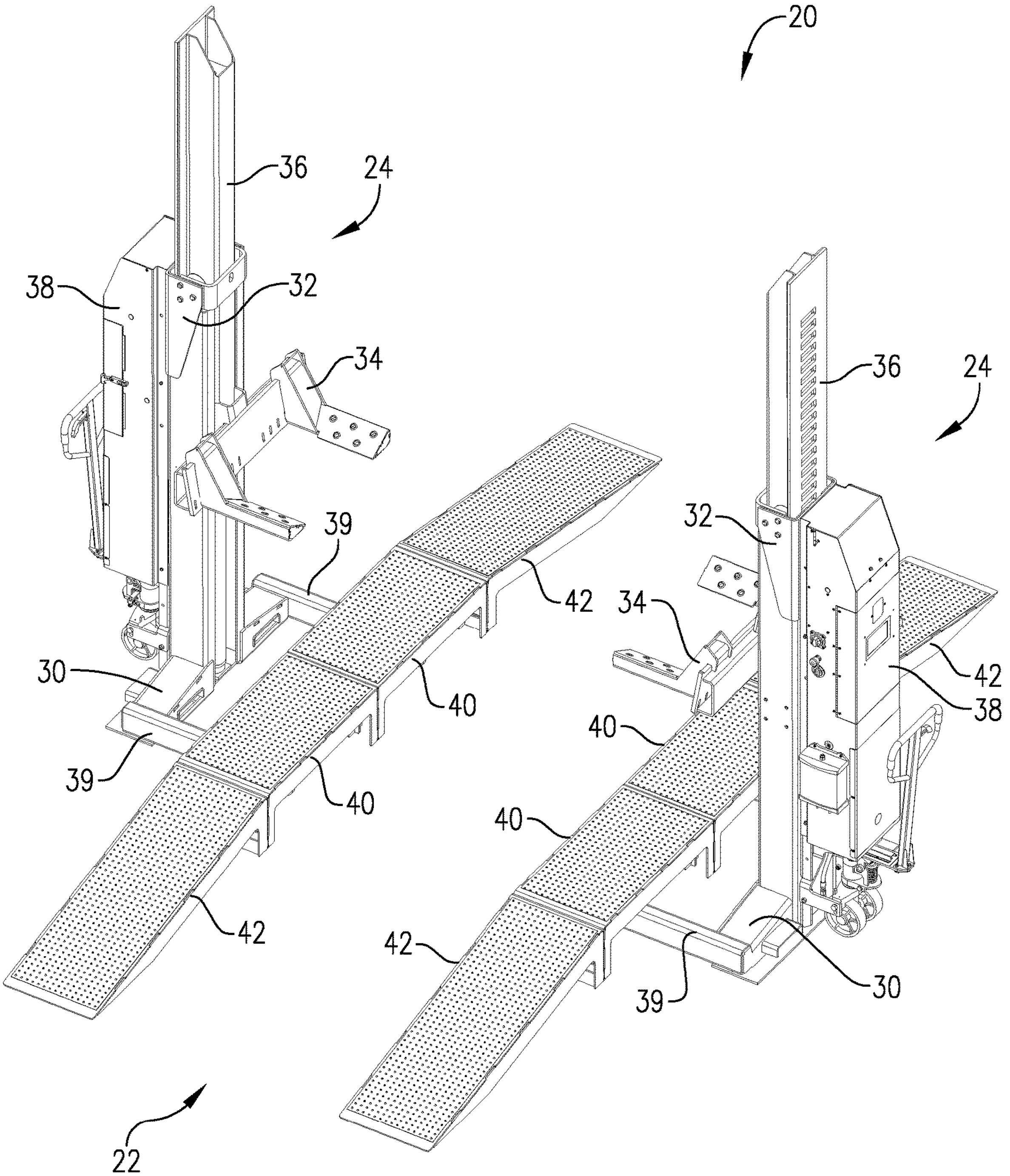
FIG. 2 is a perspective view of a truck support assembly and two portable vehicle lifts from the truck undecking system of FIG. 1.

With reference to FIGS. 1 and 2, embodiments of the present invention comprise a truck undecking and/or undecking system 20 (referred to herein as the “truck undecking system”), which includes a truck support assembly 22 and one or more portable column lifts 24. Beneficially, such a truck undecking system 20 eliminates the need for an operator to crawl under a truck suspended in the air by a crane using straps connected to tow hooks of the truck.

Beginning with the portable column lifts 24, exemplary lifts 24 are perhaps most clearly shown in FIG. 2, with each comprising a base 30, a post 32, a carriage assembly 34, a lift actuator 36, and a main housing 38. The base 30 supports the lift 24 on the floor or the ground. The post 32 is rigidly coupled to the base 30 and extends upwardly therefrom. The carriage assembly 34 includes a pair of lift arms and is configured to engage the wheel of a vehicle and is vertically shiftable relative to the post 32. The lift actuator 36 is received in the post 32 and is operable to vertically raise and lower the carriage assembly 34 relative to the post 32 and the base 30. The main housing 38 is attached to the post 32 and encloses many of the components that make up the control and power systems of the lift 24. Notably, the base 30 may include a pair of elongated, spaced apart support legs 39 that supports the lift 22 on the ground. The base 30 and/or the legs 39 may include wheels that facilitate movement of the lift 24 on the ground.

Turning to the truck support assembly 22, as illustrated in FIGS. 2-5, the truck support assembly 22 may comprise a plurality of interconnected main platforms 40 and ramps 42. In more detail, the truck support assembly 22 may comprise two, generally equivalent sections in the form of a left-side section and a right-side section. Each section may comprise one or more main platforms 40 with a ramp 42 on either end (i.e., at both longitudinal ends) of the main platforms 40. For example, as illustrated in the drawings, each section of the truck support assembly 22 may comprise at least two main platforms 40 with a ramp 42 on either end (i.e., at both longitudinal ends) of the main platforms 40.

The main platforms 40 and the ramps 42 of each section may be secured together via fasteners, connection mechanisms, welding, or the like. However, it may be preferred that fasteners, snap-fit connections, tongue-in-groove connections, or other temporary connection mechanisms be used to allow for the components of the truck support assembly 22 to releasably connect with each other, to allow for modularity of the truck support assembly 22. Generally, the truck support assembly 22 will comprise two matching sections, i.e., the left-side section and the right-side section. As such, the left-side and the right-side wheels of a truck can be driven up one of the ramps 42 and onto the main platforms 40 of respective left-side and right-side sections of the truck support assembly 22. The main platforms 40 can, thus, support the truck's wheels above the ground in a level, even manner. It is noted that additional main platforms 40 may be added to each of the left-side and right-side sections of the truck support assembly 22 to accommodate longer wheelbase trucks.

Figure 4:
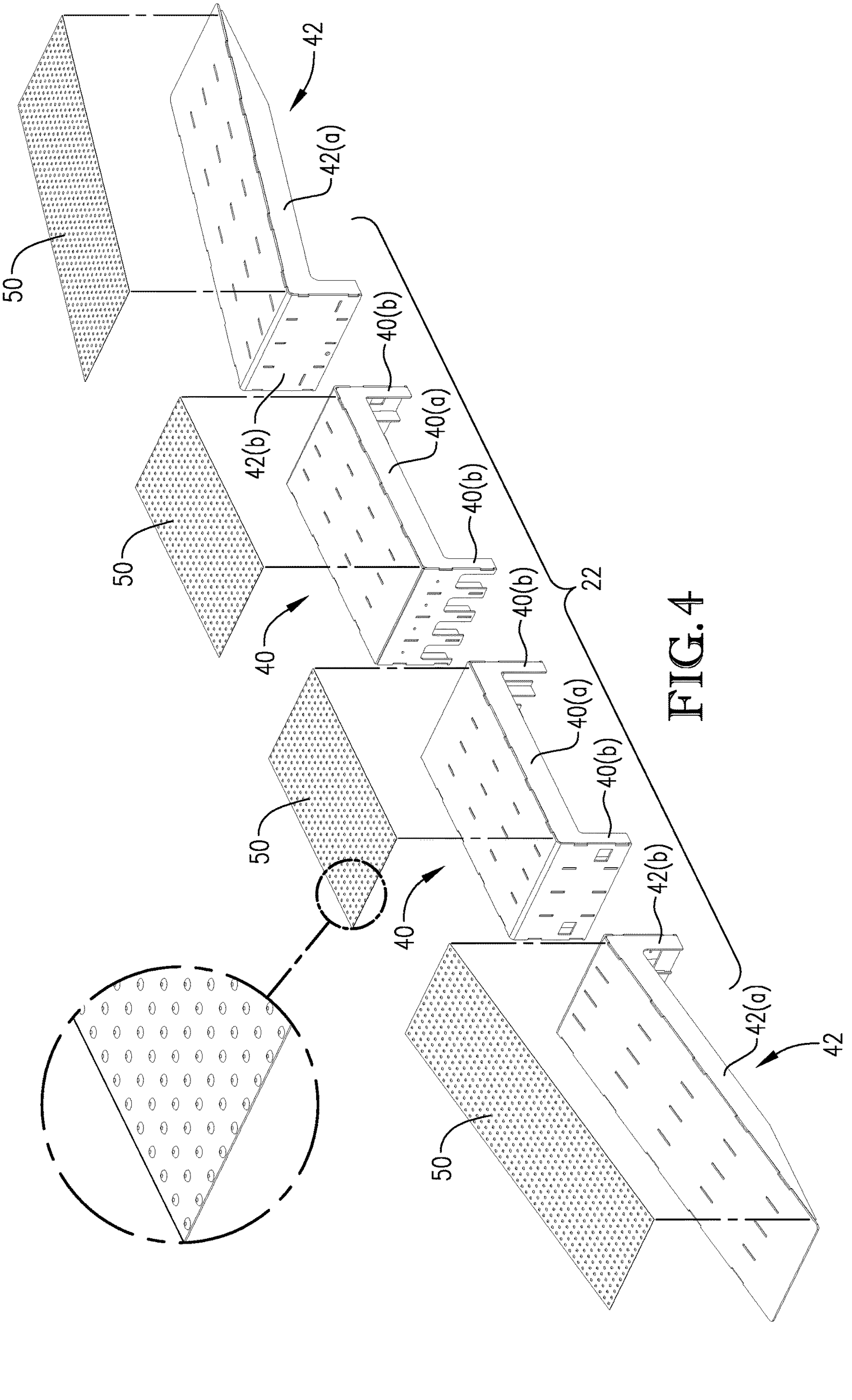
FIG. 4 is a top perspective view of a section of the truck support assembly from FIGS. 2 and 3, including a pair of main platforms and a pair of ramps, with a traction-enhancing material shown separated from the main platforms and ramps.
Figure 5:
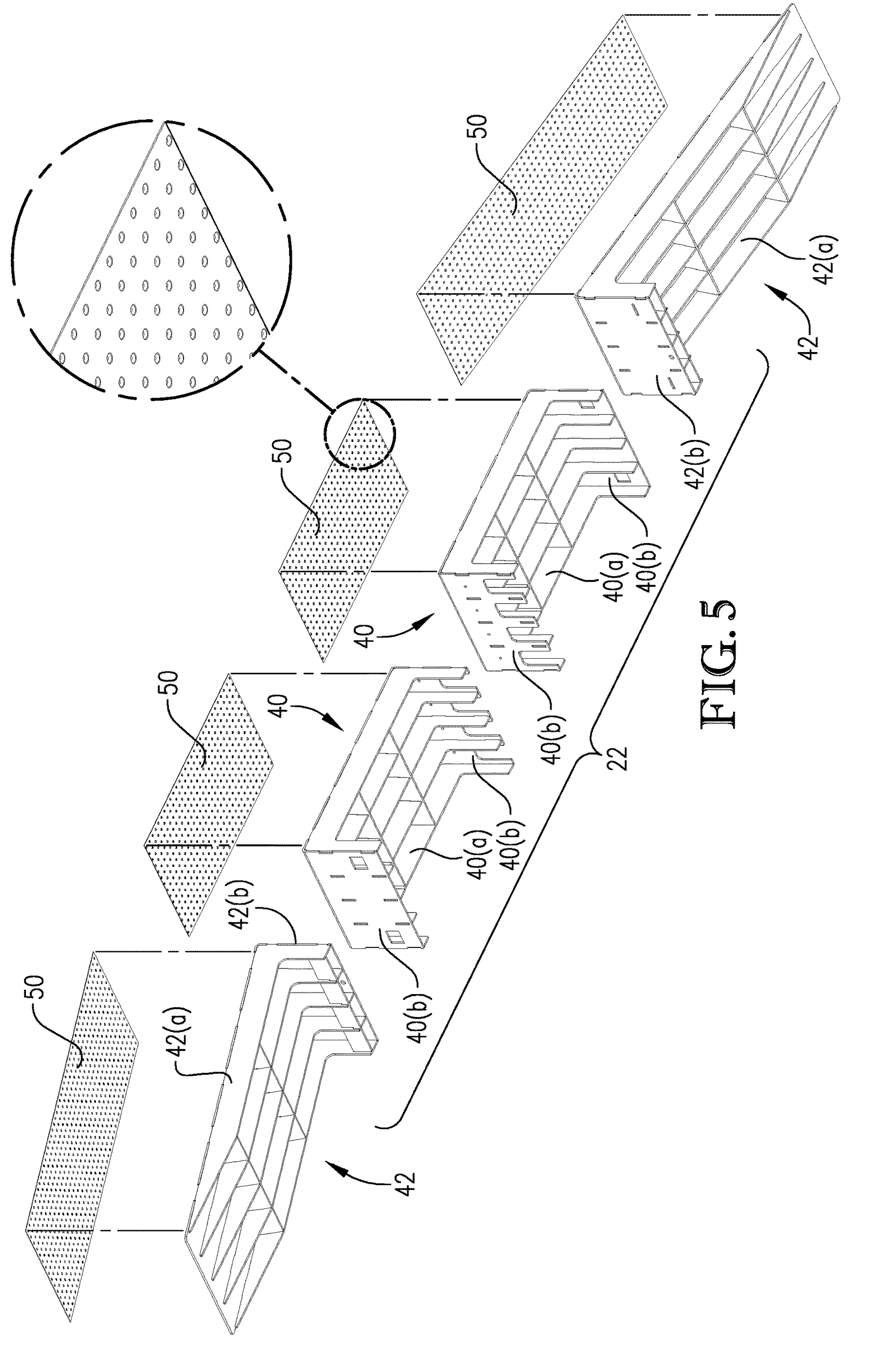
FIG. 5 is a bottom perspective view of the truck support assembly from FIG. 4.

Turning to the components of the truck support assembly 22 in more detail, as perhaps best shown in FIGS. 4 and 5, each of the ramps 42 may comprise an elongated top plank 42(*a*) with a top driving surface that extends in an angled manner from a lower end of the ramp 42 (which is at one longitudinal end and is configured to contact the ground surface) to an upper end of the ramp 42 (which is at an opposite longitudinal end). The upper end of the ramp 42 is supported above the ground surface by an upright support 42(*b*) that extends down from the upper end of the ramp 42 and configured to contact the ground surface. The underside of the ramps 42 may be reinforced with longitudinal and/or laterally-extending gussets. The ramps 42 may be formed with a width from 12 to 24 inches, from 15 to 21 inches, or about 18 inches; a length from 36 to 72 inches, from 44 to 64 inches, or about 54 inches; and/or a height (as measured from a bottom of the upright support 42(*b*) to the top driving surface at the upper end of the ramp 42) from 8 to 14 inches, from 10 to 12 inches, or about 11 inches.

Each of the main platforms 40 may comprise an elongated top plank 40(*a*) with a top driving surface that extends in a generally level, horizontal manner from a first end of the main platform 40 (which is supported above the ground surface by an upright support 40(*b*) that extends down from the first end of the main platform 40 and is configured to contact the ground surface) to a second, opposite end of the main platform 40 (which is also supported above the ground surface by an upright support 40(*b*) that extends down from the second end of the main platform 40 and is configured to contact the ground surface). The main platforms 40 may be formed with a width from 12 to 24 inches, from 15 to 21 inches, or about 18 inches; a length from 24 to 48 inches, from 30 to 42 inches, or about 36 inches; and/or a height (as measured from a bottom of one of the upright supports 40(*b*) to the top driving surface at the respective end of the main platform 40) from 8 to 14 inches, from 10 to 12 inches, or about 11 inches.

The upper ends of the ramps 42 may be coupled with one of the ends of the main platforms 40, and the heights of the upper ends of the ramps 42 will generally be equal to the ends of the main platforms 40, such that a vehicle's tire can travel from the ground surface, up the ramp 42, and onto the main platform 40 (or alternatively, off the main platform 40, down the ramp 42, and onto the ground surface). As illustrated by FIGS. 4 and 5, the top driving surfaces of the main platforms 40 and/or the ramps 42 may include a traction-enhancing material 50, such as a dimpled plate (e.g., metal or polymeric), a polymeric coating with sand or other particulate embedded therein, or the like, to provide enhanced adhesion between the truck undecking system 20 and the tires of the trucks driving thereon. Furthermore, the bottoms of the main platforms 40 and/or the ramps 42 may include anchor points and/or traction-enhancing material (e.g., non-skid rubber pads) to inhibit movement of the main platforms 40 and/or the ramps 42 during operation.

Figure 3:
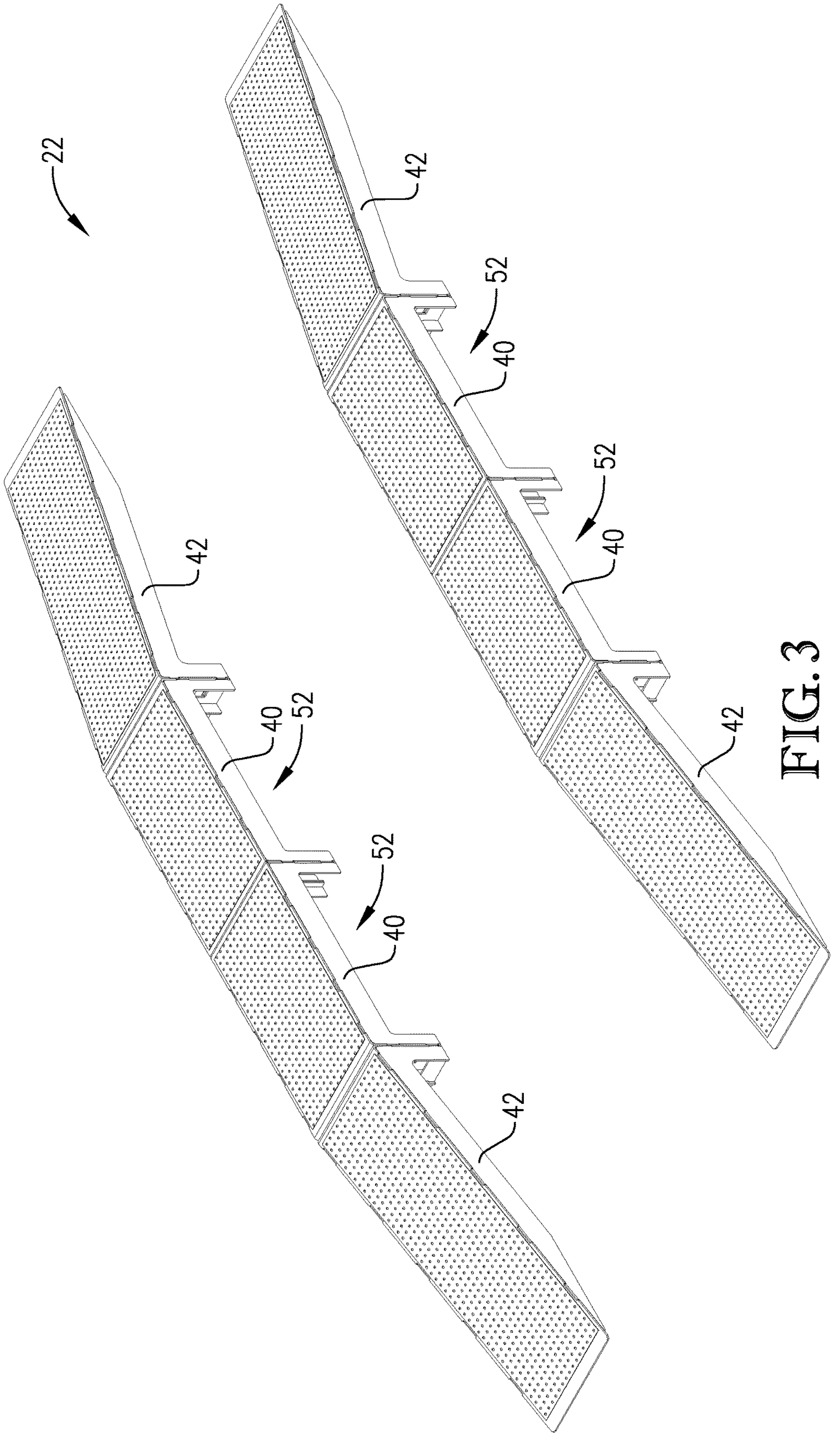
FIG. 3 is a perspective view of the truck support assembly from FIG. 2.

Notably, as perhaps best shown in FIG. 3, each main platform 40 is configured to have a receiving space 52, e.g., an open area or a cavity, formed between the upright supports 40(*b*) on the ends of the main platform 40 (the upright supports 40(*b*) are labeled in FIGS. 4 and 5). The receiving space 52 is positioned below the elongated plank 40(*a*) and extends through the entire width of the main platform 40 (the elongated planks 40(*a*) are labeled in FIGS. 4 and 5). As such, the receiving space 52 of the main platform 40 is particularly configured (e.g., in size and shape) to allow a portion of a base 30 (e.g., the legs 39 of the base 30) of a lift 24 to be received therein, as perhaps best shown in FIGS. 6 and 7.

Figure 8:
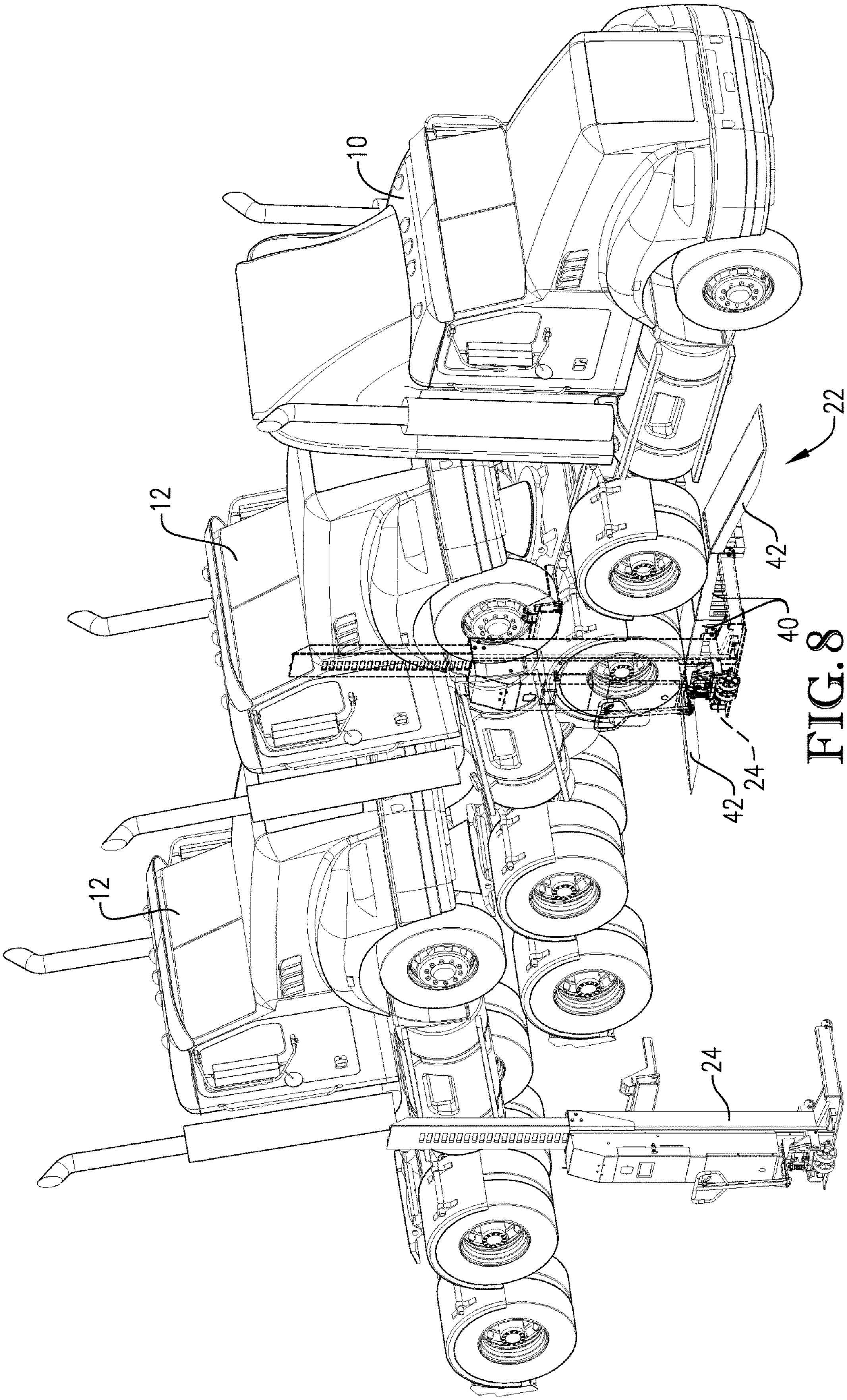
FIG. 8 is a perspective view of the truck undecking system from FIGS. 1 and 2, with rear wheels of the towing truck from the group of decked trucks being supported on the truck support assembly such that a portable vehicle lift can be used to lift and/or support a front wheel of the towed truck directly supported on the towing truck.

The truck undecking system 20 may be used to undeck one or more towed trucks 12 that are decked to a towing truck 10. For example, FIG. 1 illustrates three towed trucks 12 decked to a single towing truck 10, with the group of trucks 10,12 approaching a truck undecking system 20 for undecking of the trucks 10,12. The truck undecking system 20 may, in some embodiments, be utilized on a large concrete slab or a drive-thru bay. Specifically, a left-side section and a right-side section of the truck undecking system 20 may each be assembled to include one or more main platforms 40 (e.g., two main platforms 40) and a ramp 42 on both longitudinal ends of the main platforms 40. As such, each of the left-side and right-side sections are spaced apart a sufficient distance so that the rear wheels of the towing truck 10 can be driven up the ramps 42 and supported on the top driving surface of the main platforms 40, as shown in FIG. 8. As noted above, FIG. 1 illustrates a pair of left-side and right-side sections of the truck support assembly 22 of the truck undecking system 20 arranged side by side to be configured to receive the rear wheels of a towing truck 10 (the drawing also shows a lift 24 associated with each left-side and right-side section).

Figure 9:
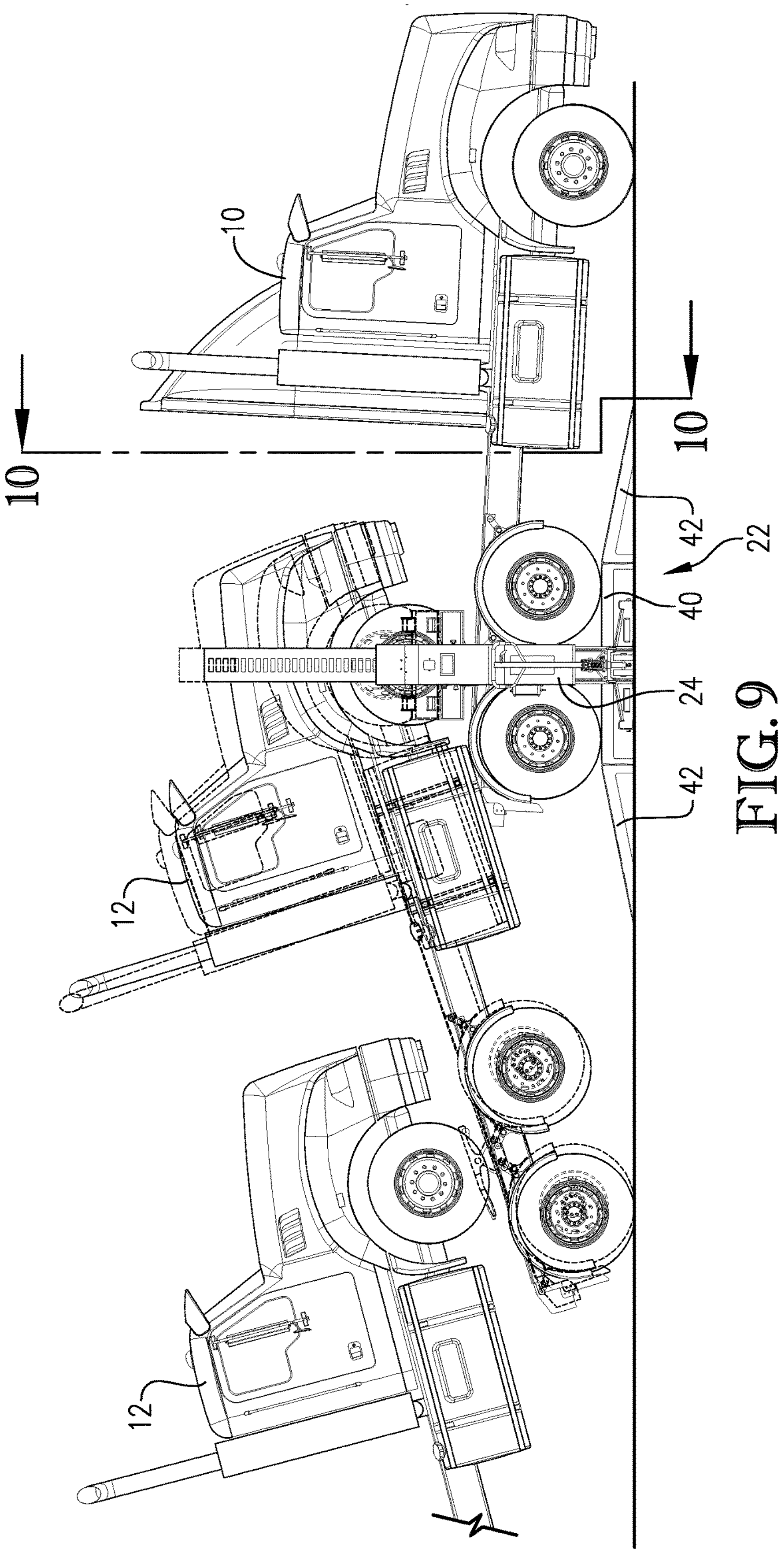
FIG. 9 is a partial side elevation view of the truck undecking system and group of decked trucks from FIG. 8, with the portable vehicle lift shown lifting the front wheel of the towed truck directly supported on the towing truck.

In operation of the truck undecking system 20, as illustrated in FIG. 8 (only showing two towed trucks 12 decked to a towing truck 10), the towing truck 10 can be driven forward over the truck support assembly 22, such that the each pair of rear wheels (e.g., the forward and rearward pair of rear wheels of each of the left-side and the right-side) of the towing truck 10 are driven up one of the ramps 42 and supported on the main platforms 40 of one of the sections (e.g., a left-side section and a right-side section) of the truck support assembly 22. Although FIGS. 8 and 9 illustrate only one section (i.e., a right-side section) supporting one side of the towing truck's 10 pair of rear wheels, it is understood that the truck support assembly 22 will generally include two sections so as to simultaneously support both sides of the towing truck's 10 rear wheels. As noted, the sections of the truck support assembly 22 are spaced sufficiently apart to ensure both sides of the towing truck's 10 rear tires are in full contact with the top surfaces of the main platforms 40.

Figure 10:
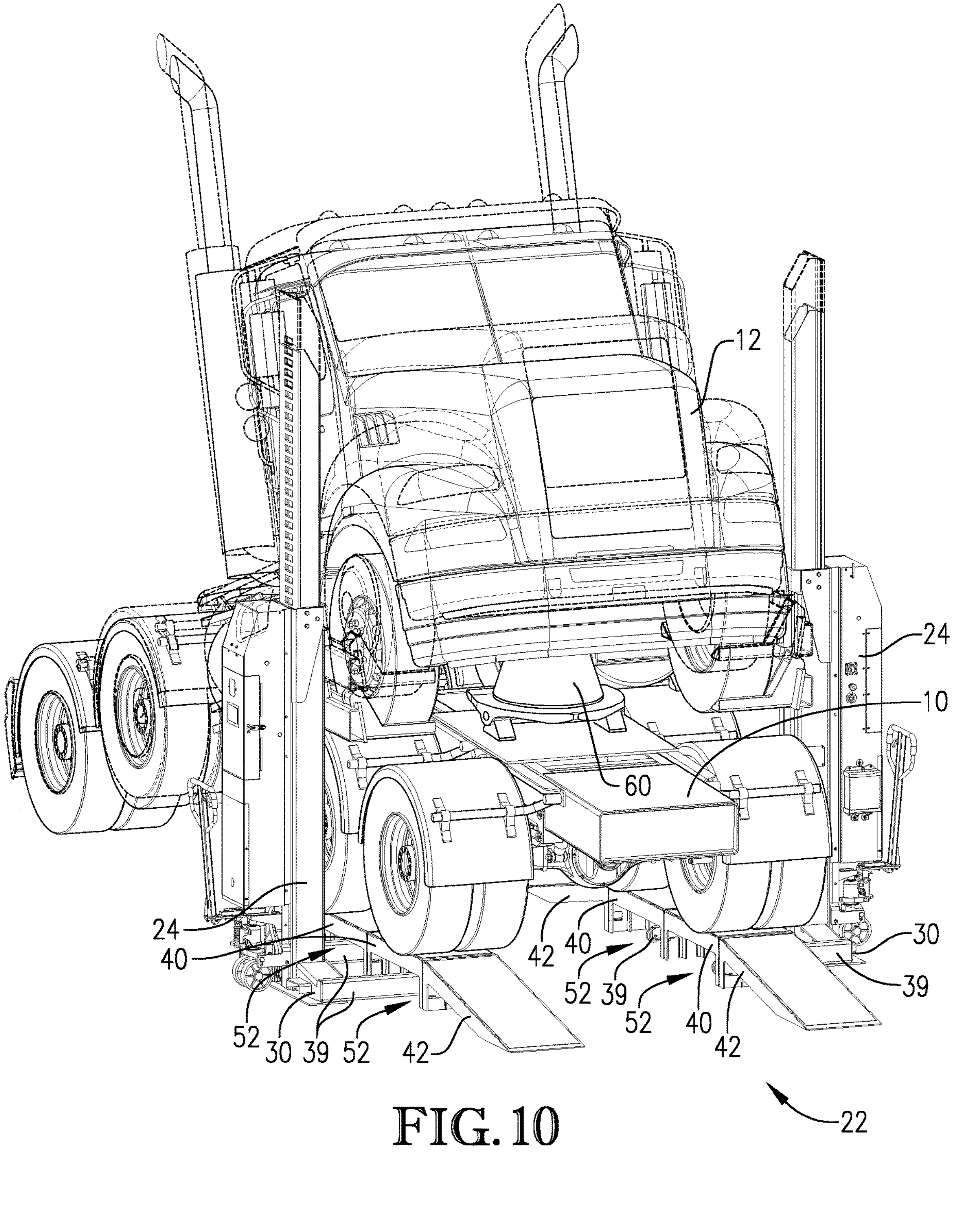
FIG. 10 is a cross section taken along the line 10-10 from FIG. 9.

Next, a lift 24 can be positioned to the outside of each of the left-side and the right-side sections of the truck support assembly 22, as illustrated in FIGS. 8-10. As such, the carriage assemblies 34 of the lifts 24 may then be raised in unison to a height where the lift arms of the carriage assemblies 34 have cleared the tops of the rear tires of the towing truck 10 and can cradle the front tires of the towed truck 12 that is directly mounted on the towing truck 10. In such a configuration, as perhaps best shown in FIG. 10, the positions of the lifts 24 can then be shifted inward towards the trucks 10, 12 and/or the truck support assembly 22, such that at least a portion of the bases 30 of the lifts (e.g., the legs 39 of the bases 30) are inserted within the receiving spaces 52 presented by the main platforms 40. Specifically, because the truck support assemblies 22 may include two main platforms 40, each with a receiving space 52 presented under the plank 40(*a*) and between the upright support 40(*b*), lifts 24 with bases 30 having two legs 39 can be engaged with the truck support assemblies 22 such that each of the two legs 39 is inserted within one of the receiving spaces 52.

Figure 6:
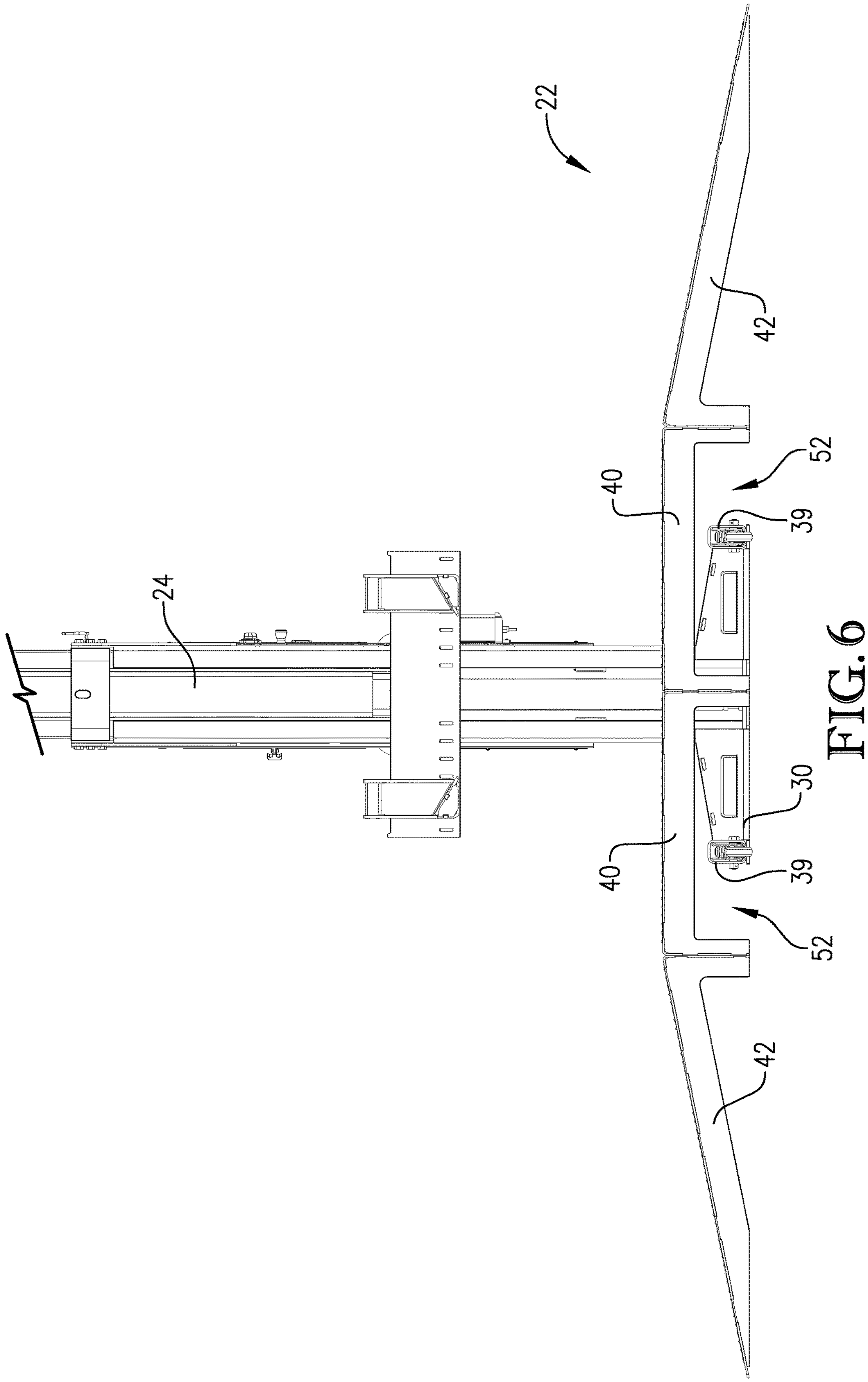
FIG. 6 is a side elevation view of one section of the truck support assembly and one portable vehicle lift from FIG. 2.
Figure 7:
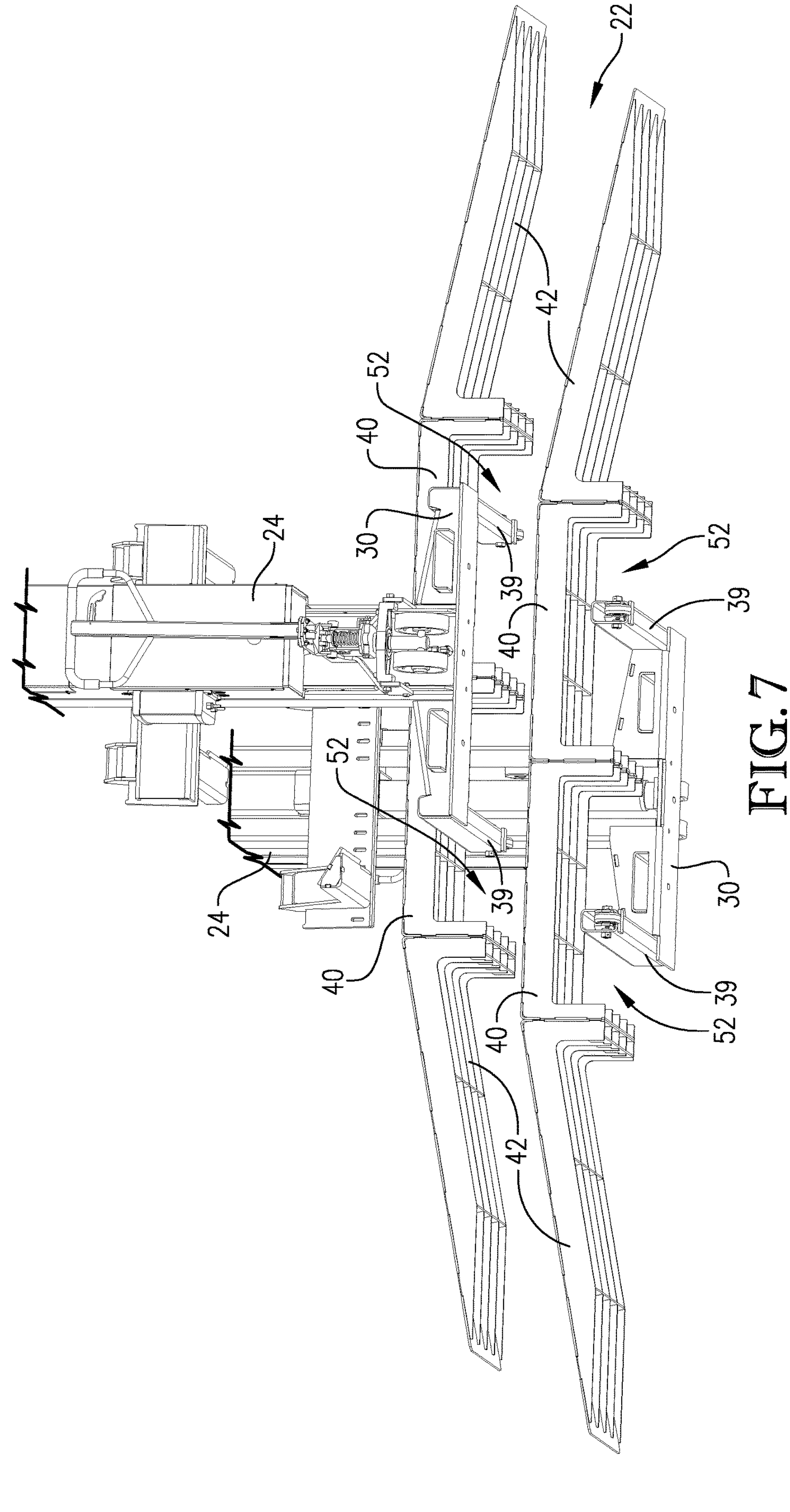
FIG. 7 is a lower perspective view of the truck support assembly and two portable vehicle lifts from FIG. 2.

As such, the legs 39 of the bases 30 will be positioned underneath the top driving surfaces of the elongated planks 40(*a*) of the main platforms 40 (the planks 40(*a*) are referenced in FIGS. 6 and 7). With the lift arms of the carriage assemblies 34 of the lifts 24 positioned below the front tires of the towed truck 12 that is directly mounted on the towing truck 10, the carriage assemblies 34 of the lifts 24 can be raised in unison again to capture and partially raise both front tires of the towed truck 12, as shown in FIG. 10. In some embodiments, each of the lifts 24 may include control systems (e.g., having one or more processing elements and/or memory elements) with wireless communications capabilities, such that both of the lifts may work in unison to raise and/or lower the trucks 10,12.

Figure 11:
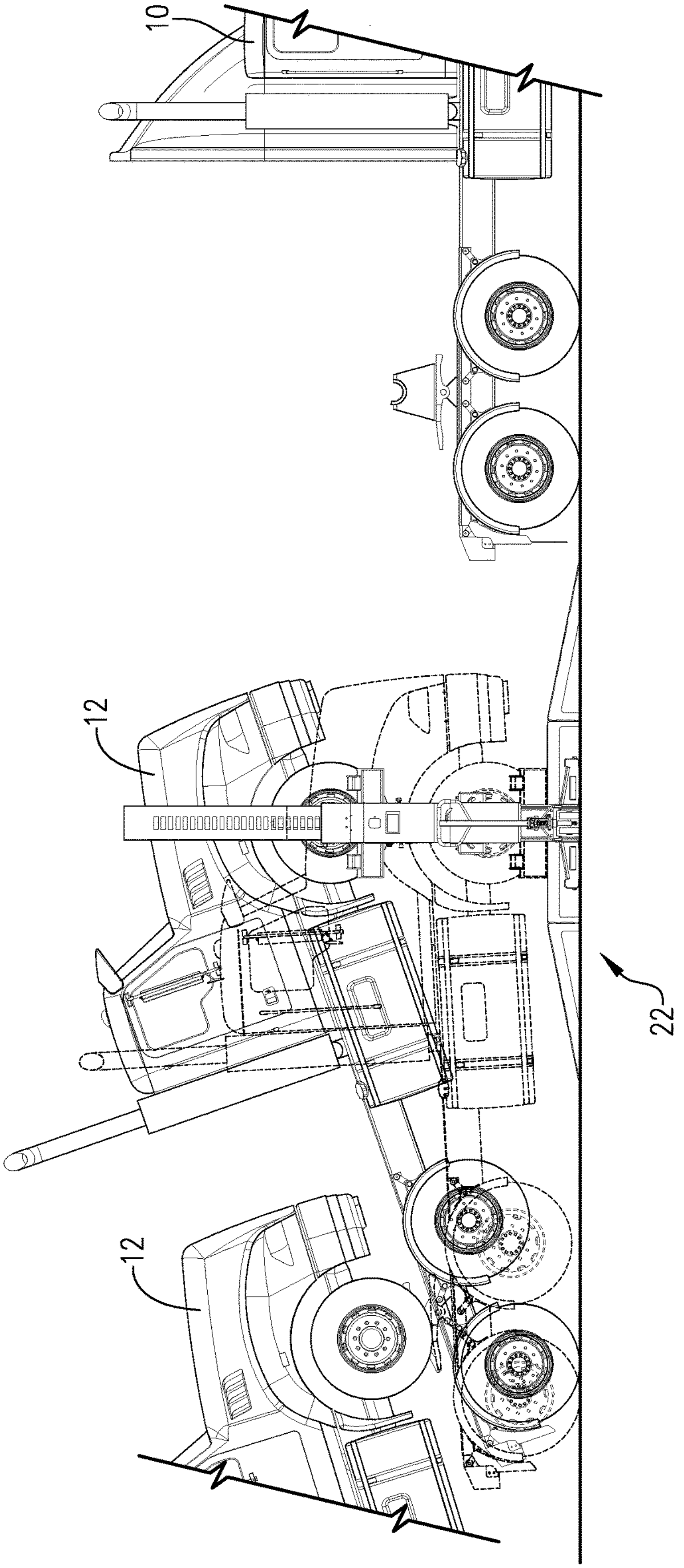
FIG. 11 is a partial side elevation view of the truck undecking system and group of decked trucks from FIG. 9, with the towed truck undecked from the towing truck, such that the towing truck may be driven off the truck support assembly and the towed truck can be lowered to become a new towing truck.

As such, the weight of the towed truck 12 will be supported by lifts 24, thus allowing a driver or operator to crawl under the towed truck 12 and unfasten the connection mechanism 60 (See FIG. 10) connecting the towed truck 12 to the towing truck 10. In some embodiments, the connection mechanism 60 may be a saddle, such that the driver or operator will be required to loosen retaining nuts or bolts of the saddle. Once the connection mechanism 60 is unfastened (and with the front of the towed truck 12 supported above the ground by the lifts 24), the driver can pull the towing truck 10 forward off the truck support assembly 22, as shown in FIG. 11. The towed truck 12 can then be lowered using the lifts 24 onto the ground or onto the truck support assembly 22. As such, the towed truck 12 will become the towing truck 10 if there are any additional towed trucks 12 being supported. If so, the above-described process can be repeated until all trucks 10, 12 are undecked from each other.

Although the above description illustrates how the truck undecking system 20 may be used to undeck trucks 10, 12 from each other, it should be understood that in some embodiments, the truck undecking system 20 may also be used to deck trucks 10,12 together. For instance, two lifts 24 may be used to lift the front wheels of a towed truck 12 that is to be decked to a towing truck 10. With the towed truck's front wheels in the air by the carriage assemblies 34 of the lifts, the truck support assembly 20 may be constructed around the base 30 of the two lifts 24. Specifically, one or more main platforms 40 may be coupled with ramps 42 at either end of the main platforms 40, and the main platforms 40 may be positioned over the bases 30 of the lifts 24 such that the legs 39 of the bases 30 are positioned within the receiving spaces 52 of the main platforms 40. The rear wheels of the towing truck 10 may then be driven onto the truck support assembly 22 until the rear wheels are supported on the top driving surfaces of the main platforms 40. As such, carriage assemblies 34 of the lifts 24 may lower the towing truck 10 to secure the connection mechanism 60 that interconnects the towing truck 10 to the towed truck 12. Once the connection is complete, the lifts 24 may be lowered and removed, and the process can be repeated to deck any additional trucks to the already-decked trucks.

Additional Considerations

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

What is claimed is:

1. A vehicle undecking system for undecking a towed vehicle from a towing vehicle, said system comprising:

at least one portable vehicle lift, wherein each lift includes—
  a base,
  a carriage configured to receive a portion of the towed vehicle, and
    an actuator configured to vertically raise and lower the carriage relative to the base; and a support assembly including at least one ramp and at least one main platform, wherein the at least one ramp is configured to be coupled with the at least one main platform, wherein the at least one ramp includes an angled top driving surface, and wherein the at least one main platform includes a generally horizontal top driving surface, wherein the at least one main platform includes a receiving space located below the top driving surface, wherein the receiving space is configured to receive at least a portion of the base of the lift.

2. The system of claim 1, wherein the main platform is supported above a ground surface by one or more upright supports.

3. The system of claim 2, wherein the one or more upright supports includes an upright support at each of two ends of the main platform, and wherein the receiving space is located between the upright supports.

4. The system of claim 3, wherein the base of the lift comprises one or more legs, and wherein the receiving space of the support assembly is configured to receive at least one of the one or more legs.

5. The system of claim 1, wherein the support assembly includes at least two ramps and at least two main platforms.

6. The system of claim 5, wherein the main platforms are coupled to each other, and wherein the ramps are coupled to opposite ends of the coupled main platforms.

7. The system of claim 6, wherein the ramps and the main platforms are releasably coupled to each other.

8. The system of claim 5, wherein the at least two ramps and the at least two main platforms comprise a first section of the support assembly, and wherein the support assembly comprises a second section including at least two additional ramps and at least two additional main platforms.

9. The system of claim 8, wherein the first section and the second section are configured to be spaced apart from each other to support left-side and right-side wheels of the towing vehicle.

10. The system of claim 9, wherein the at least one portable vehicle lift comprises at least two portable vehicle lifts including a first lift and a second lift, wherein the first lift is associated with the first section of the support assembly, and wherein the second lift is associated with the second section of the support assembly.

11. The system of claim 1, wherein the top driving surfaces of the at least one ramp and the at least one main platform include traction-enhancing material to provide increased friction for tires of the towing vehicle.

12. A vehicle undecking system configured to undeck a towed vehicle from a towing vehicle, said system comprising:

a portable vehicle lift configured to raise and lower the towed vehicle; and a support assembly including at least one ramp and at least one main platform, wherein the at least one ramp is configured to be coupled with the at least one main platform, wherein the at least one ramp includes an angled top driving surface, and wherein the at least one main platform includes a generally horizontal top driving surface, wherein the at least one main platform includes a receiving space located below the top driving surface, wherein the receiving space presents an opening that extends through an entire width of the at least one main platform, wherein the receiving space is configured to receive at least a portion of the lift.

13. The system of claim 12, wherein the main platform includes an upright support at each of two ends of the main platform, and wherein the receiving space is located between the upright supports.

14. The system of claim 12, wherein the support assembly includes at least two ramps and at least two main platforms, wherein the main platforms are coupled to each other, and wherein the ramps are coupled to opposite ends of the coupled main platforms.

15. The system of claim 14, wherein the at least two ramps and the at least two main platforms comprise a first section of the support assembly, and wherein the support assembly comprises a second section including at least two additional ramps and at least two additional main platforms.

16. The system of claim 15, wherein the lift is a first lift and the system further comprising a second lift, wherein the first lift is associated with the first section of the support assembly, and wherein the second lift is associated with the second section of the support assembly.

17. A process for undecking a towed vehicle that is supported on a towing vehicle, said process comprising the following steps:

(a) providing a support assembly including a first section and a second section, wherein each section includes at least one ramp and at least one main platform, wherein the at least one ramp includes an angled top driving surface, and wherein the at least one main platform includes a generally horizontal top driving surface;

(b) driving rear wheels of the towing vehicle onto the support assembly;

(c) positioning a lift on each of two lateral sides of the towed vehicle, adjacent to front wheels of the towed vehicle, wherein each lift includes a base, a carriage configured to receive a front wheel of the towed vehicle, and an actuator configured to vertically raise and lower the carriage relative to the base; and (d) shifting the lifts into engagement with the front wheels of the towed vehicle, wherein during said shifting of step (d) at least a portion of the bases of the lifts are inserted within receiving spaces presented below the top driving surfaces of the main platforms of the support assembly.

18. The process of claim 17, further including the step of raising the towed vehicle with the lifts to support at least a portion of a weight of the towed vehicle with the lifts.

19. The process of claim 18, further including the steps of uncoupling the towed vehicle from the towing vehicle, and driving the towing vehicle away from the towed vehicle such that the rear wheels of the towing vehicle are no longer supported on the support assembly.

20. The process of claim 19, further including the steps of lowering the towed vehicle onto the ground surface or onto the support assembly.

21. A process for decking a towed vehicle to a towing vehicle, said process comprising the following steps:

(a) positioning a lift on each of two lateral sides of the towed vehicle, adjacent to front wheels of the towed vehicle, wherein each lift includes a base, a carriage configured to receive a front wheel of the towed vehicle, and an actuator configured to vertically raise and lower the carriage relative to the base;

(b) raising, via the lifts, the front wheels of the towed vehicle;

(c) providing a support assembly including a first section and a second section, wherein each section includes at least one ramp and at least one main platform, wherein the at least one ramp includes an angled top driving surface, and wherein the at least one main platform includes a generally horizontal top driving surface;

wherein upon said providing of step (c), at least a portion of the bases of the lifts are received within receiving spaces presented below the top driving surfaces of the main platforms of the support assembly; and (d) driving the rear wheels of the towing vehicle onto the support assembly.

22. The process of claim 21, further including the step of coupling the towed vehicle with the towing vehicle.

* * * * *